United States Patent [19]
Lacey et al.

[11] Patent Number: 5,875,527
[45] Date of Patent: Mar. 2, 1999

[54] FASTENER ELEMENT ARRANGEMENT

[75] Inventors: Thomas G. Lacey, Derry; Scott M. Filion, Newmarket; Evangelos Kaparis, Manchester, all of N.H.

[73] Assignee: Velcro Industries B.V., Curacao, Netherlands Antilles

[21] Appl. No.: 920,513

[22] Filed: Aug. 29, 1997

[51] Int. Cl.⁶ .................................................. A44B 18/00
[52] U.S. Cl. ................................. 24/452; 24/442; 24/447
[58] Field of Search ............................ 24/306, 442–452, 24/575–577

[56] References Cited

U.S. PATENT DOCUMENTS

| | | |
|---|---|---|
| 3,708,833 | 1/1973 | Ribich et al. . |
| 3,762,000 | 10/1973 | Menzin et al. . |
| 4,725,221 | 2/1988 | Blanz . |
| 4,794,028 | 12/1988 | Fischer . |
| 4,984,339 | 1/1991 | Provost et al. ............................ 24/452 |
| 5,326,612 | 7/1994 | Goulait ................................... 24/452 X |
| 5,339,499 | 8/1994 | Kennedy et al. . |
| 5,604,963 | 2/1997 | Akeno . |
| 5,657,517 | 8/1997 | Akeno et al. ............................. 24/452 |
| 5,664,301 | 9/1997 | Akeno ................................... 24/447 X |

FOREIGN PATENT DOCUMENTS 499 461 A1  8/1992  European Pat. Off. .

*Primary Examiner*—Anthony Knight
*Assistant Examiner*—Robert J. Sandy
*Attorney, Agent, or Firm*—Fish & Richardson P.C.

[57] ABSTRACT

A hook-type fastener product for engaging loop elements is disclosed, having parallel rows of hooks having differently constructed first and second sides. The hooks are arranged such that, when engaged with loops, they resist disengagement from the loops more strongly when pulled in one sideways direction than when pulled in the opposite sideways direction. The product has a common base from which the hooks, which are not limited to J-type hooks, extend. The first sides of the hooks may be flat and the second sides convex. Methods and an apparatus for producing the product are also disclosed.

20 Claims, 9 Drawing Sheets

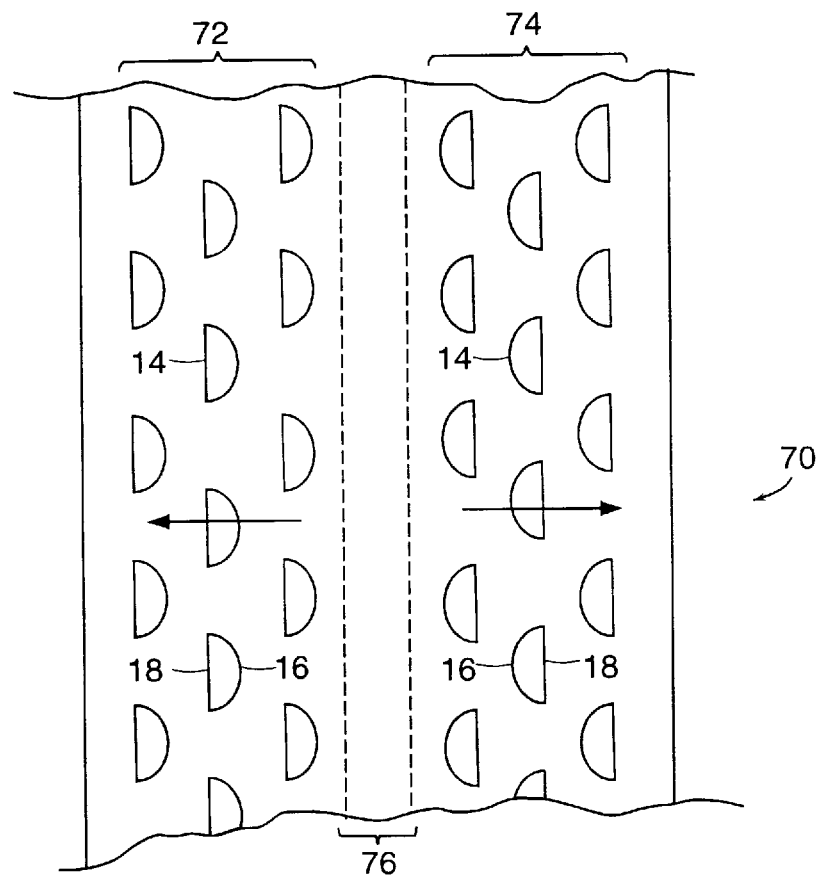
FIG. 11
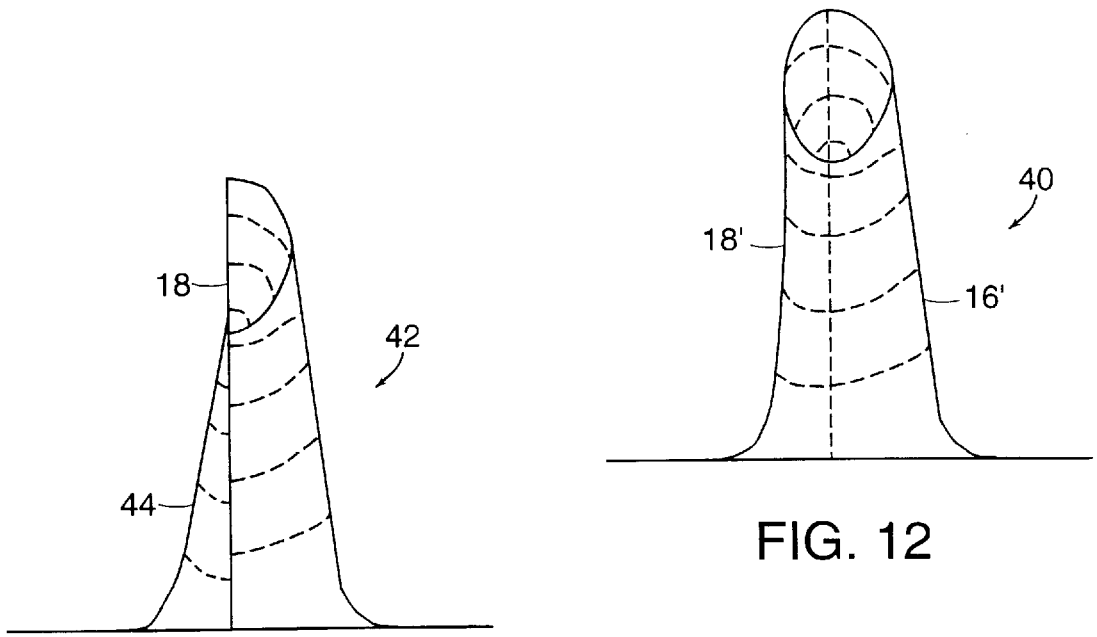
FIG. 12A
FIG. 12

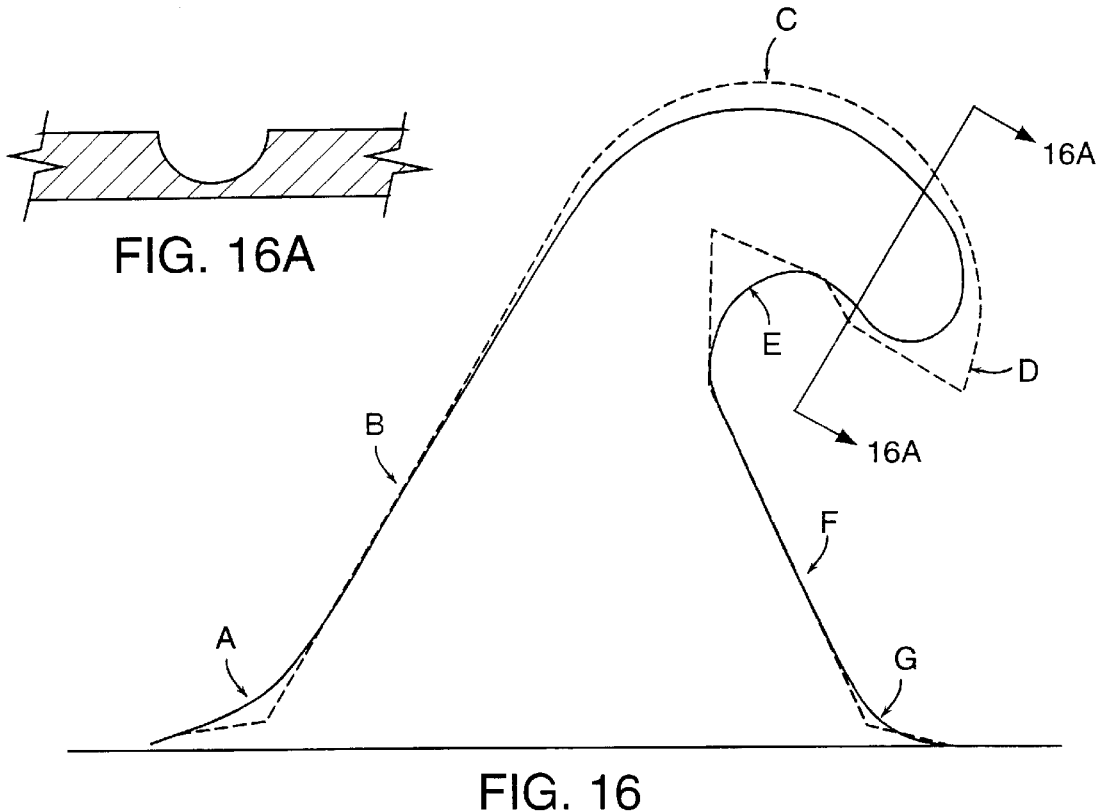
FIG. 16A
FIG. 16
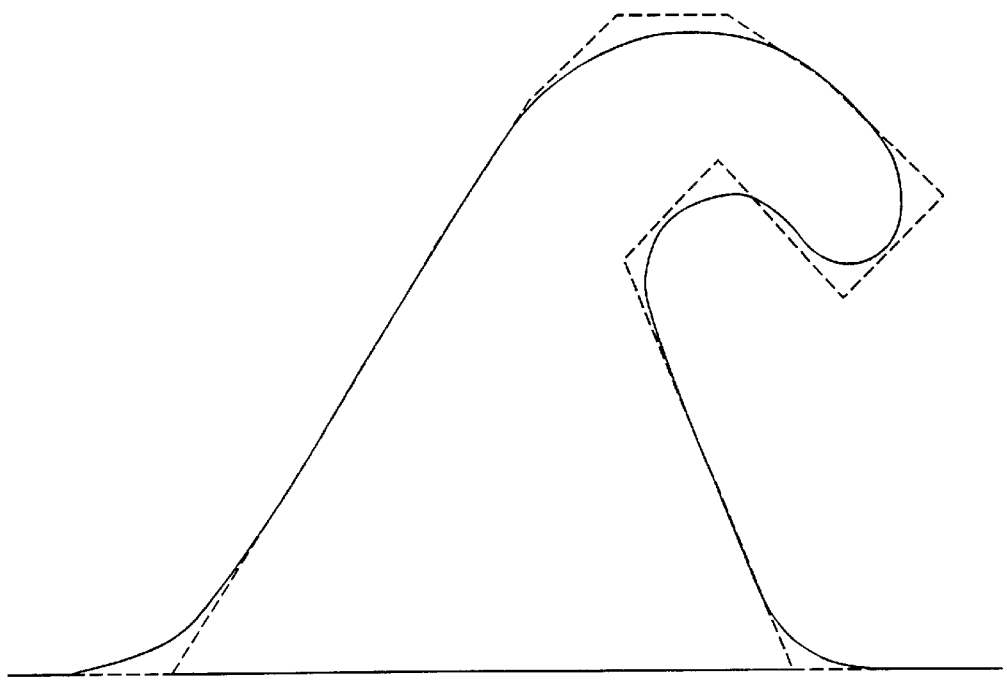
FIG. 17

FASTENER ELEMENT ARRANGEMENT

BACKGROUND OF THE INVENTION

This invention relates to the arrangement of touch fastener elements on a common base.

In the field of molded touch fasteners, typically a series of adjacent rows of male fastener elements, such as the molded hooks disclosed by Fischer in U.S. Pat. No. 4,974,028, engage loops or anchored fibers to form a separable closure. The male fastener elements (i.e., "hooks") extend from a common base, and have overhanging heads formed at the distal ends of elongated stems. The heads of the hooks capture and retain loops.

Molded hook fastener strips formed in a continuous process with a rotating mold roll have hooks arranged in rows running along the length of the strip, in the "machine direction" of the molding process. The heads of such hooks are generally aligned to face in the direction of the row to facilitate removal from the mold cavities of the mold roll. So aligned, molded arrays of hooks can demonstrate loop-retaining performance characteristics that are direction-dependent. For instance, a hook-and-loop closure may withstand, in some instances, a shear load in the machine direction of greater magnitude than a shear load in the cross-machine direction. This effect is partly a function of hook construction.

As used herein, these terms should be interpreted as follows: a "shear load" is a separating load applied between mating sides of a planar closure, acting within the plane of the closure; a "peel load" is a separating load applied between mating components to peel them apart, sequentially disengaging hooks (cross-machine peel typically contains an element of cross-machine shear load at the hook level); a "hook" is a male fastening element constructed to engage loops, and is not limited to a J-type shape; the "machine direction" is along the direction of extent of a row of hooks; and the "cross-machine direction" is perpendicular to the machine direction and within the plane of the closure.

SUMMARY OF THE INVENTION

We have realized that, by providing differently constructed loop-engaging surfaces on opposite sides of a hook, and by aligning such hooks in an array, the closure properties of such an array of modified hooks can be effectively varied to provide advantageous differences in performance between opposing cross-machine loop loading directions.

The invention features a hook-type fastener product for engaging loop elements to form a fastening. The product includes a base and an array of parallel rows of hooks extending from the base, the hooks extending generally along the direction of their respective rows, each hook having first and second oppositely-directed sides directed sideways relative to its row. Each hook has a stem extending from the base to a distal end and a head extending from the distal end of the stem to at least one tip, the head having first and second sides corresponding to the first and second sides of the hook. The sides of the hook head are differently constructed to cause a loop engaged to pull sideways against the first side of the hook head to be more firmly retained on the hook than a loop engaged to pull sideways against the second side of the hook head. A sufficient number of the hooks of the array have the first sides of their heads directed in the same sideways direction that the array of hooks, when engaged with loops, resists disengagement from the loops more strongly when pulled in a first sideways direction than when pulled in a second sideways direction opposite the first sideways direction.

In some embodiments, a majority of the hooks have the first sides of their heads directed in the same sideways direction. Preferably, at least 75% of the hooks have the first sides of their heads directed in the same sideways direction. In some cases, substantially all of the hooks have the first sides of their heads directed in the same sideways direction.

In one configuration, the hooks each have first and second edges defined between the first and second sides of the hook, the hook defining a side profile centerline equidistant from the first and second edges and extending from the base to the tip. The thickness of the hook tapers, in the region of the head, to the first and second edges. In some cases, the first and second sides of the hook head define first and second slide-off angles, respectively, at the tip in a cross-section taken in a plane tangent to the side profile centerline of the hook at the hook tip. The slide-off angles are measured with respect to a plane perpendicular to the base and extending along the row of the hook through the tip. The first slide-off angle is less than the second slide-off angle.

In some embodiments, for each of the hooks, the first and second sides of the hook head define first and second side taper angles, respectively, in a plane parallel to the base and tangent to the side profile centerline of the hook, the side taper angles being measured between a plane perpendicular to the base and extending along the row of the hook and a line tangent to the respective side of the hook. In these embodiments the second side taper angle is larger than (preferably at least 5 degrees larger than, and most preferably at least 10 degrees larger than) the first side taper angle. In some instances, the second side taper angle continuously decreases from the stem to the tip of the hook.

In some cases the second side of each of the hook heads forms, in a cross section of the head of the hook, a substantially smooth curve. In the presently preferred embodiment, the second side of the hook head comprises a convex surface extending from an upper edge of the head to a lower edge of the head and from the tip to at least the portion of the head most distant from the base.

The first side of each hook head may be substantially flat and planar. In some configurations, the first side of each hook head is substantially parallel to the direction of the rows of hooks, such that the first slide-off angle of each hook is about zero.

In some embodiments, the stem of each hook includes a reinforcing portion extending laterally from the plane of the first side of the hook head to resist bending of the stem of the hook.

In the cross section of the head of each of the hooks in some configurations, the first side of the hook forms a substantially smooth curve having a larger overall radius of curvature than the smooth curve of the second side of the hook. The first side of each hook may include a convex surface extending from an uppermost edge of the head of the hook to a lowermost edge of the head of the hook.

In some embodiments, the base is of strip form with first and second longitudinal edges and has first and second parallel arrays of hooks. A sufficient number of the hooks of the first array have their first sides directed toward the first edge of the base that the first array of hooks, when engaged with loops, resists disengagement from the loops more strongly when the hooks are pulled by the loops toward the second edge of the base than when pulled toward the first edge of the base, and a sufficient number of the hooks of the second array have their first sides directed toward a second edge of the base that the second array of hooks, when engaged with loops, resists disengagement from the loops more strongly when the hooks are pulled by the loops toward the first edge of the base than when pulled toward the second edge of the base.

According to one aspect of the invention, a method of forming a hook-type fastener product for engaging loop elements is provided. The method includes providing a mold with an array of parallel rows of hook-shaped mold cavities extending from an outer surface, the cavities extending generally along the direction of their respective rows, each cavity defined between first and second oppositely-directed sides directed sideways relative to its row. Each cavity has a stem portion extending from the outer surface to a distal end, and a head portion extending from the distal end of the stem to at least one tip. The sides of the cavity are differently constructed, to cause a loop engaged to pull sideways against the first side of a hook molded therein to be more firmly retained on the hook than a loop engaged to pull sideways against the second side of the hook. A sufficient number of the cavities of the array have their first sides directed in the same sideways direction that an array of hooks molded therein, when engaged with loops, resists disengagement from the loops more strongly when pulled in one sideways direction than when pulled in the opposite sideways direction. The method also includes filling the mold cavities with resin under pressure to form hooks, the outer surface of the mold forming a surface of a base integrally molded with and common to the hooks, cooling the hooks so that they will retain a desired shape when removed from their cavities, and removing the molded hooks from the cavities of the mold.

In some embodiments, the molded hooks are removed from the mold cavities without opening the cavities. The mold may include a series of mold plates, each of the mold plates having a row of hook-shaped mold surfaces for forming the second sides of a row of hooks, the method including arranging all of the mold plates of the series with their mold surfaces facing in a common direction.

The mold may include a first series of mold plates and a second series of mold plates not overlapping the first series, each of the mold plates of the first and second series having a row of hook-shaped mold surfaces for forming the second sides of a row of hooks. In this case, the method includes arranging all of the mold plates of the first series with their mold surfaces facing in a first, common direction, and arranging all of the mold plates of the second series with their mold surfaces facing in a second, common direction opposite the first direction.

The mold plates may be circular for continuously forming the fastener product about a mold roll composed of the circular mold plates.

According to another aspect of the invention, an apparatus is provided for forming a hook-type fastener product for engaging loop elements. The apparatus includes a mold with an array of parallel rows of hook-shaped mold cavities extending from an outer surface, the cavities extending generally along the direction of their respective rows. Each cavity is defined between first and second oppositely-directed sides directed sideways relative to its row, and includes a stem portion extending from the outer surface to a distal end, and a head portion extending from the distal end of the stem to at least one tip. The sides of the cavity are differently constructed to cause a loop engaged to pull sideways against the first side of a hook molded therein to be more firmly retained on the hook than a loop engaged to pull sideways against the second side of the hook. A sufficient number of the cavities of the array have their first sides directed in the same sideways direction that an array of hooks molded therein, when engaged with loops, resists disengagement from the loops more strongly when pulled in one sideways direction than when pulled in the opposite sideways direction. The apparatus also includes a pressure applicator arranged in close proximity to the mold for applying pressure to resin to fill the mold cavities with resin under pressure to form the hooks, and means for removing the hooks from their mold cavities after they have at least partially solidified.

Following the principles of the invention, fastener closures are provided which can be designed to have desirably high peel or shear resistance in one cross-machine direction, such as for withstanding an applied service load, while having a desirably low peel or shear resistance in another cross-machine direction, such as for manually opening the closure. This can be of particular usefulness in diaper and garment closures, for instance, and in any other application where it is desirable to have an inexpensive fastener which stays reliably closed when loaded in a predetermined direction, but yet be readily released at will.

BRIEF DESCRIPTION OF THE DRAWINGS

FIGS. 4A–4E are cross-sectional views taken along lines 4A—4A, 4B—4B, 4C—4C, 4D—4D and 4E—4E, respectively, in FIG. 4.

FIG. 11 is a plan view of a hook fastener strip product with two oppositely-facing arrays of hooks.

FIG. 12 is an end view of an alternate hook construction, having a head cross-section corresponding to FIG. 8B.

FIG. 12A is an end view of another alternate hook construction, having a head cross-section corresponding to FIG. 8A and a stem reinforcement member.

FIGS. 16 and 17 show mask profiles for photochemically etching a hook-shaped mold cavity.

FIG. 16A is a cross-sectional view, taken along line 16A—16A in FIG. 16.

DESCRIPTION OF EMBODIMENTS

Figure 1:
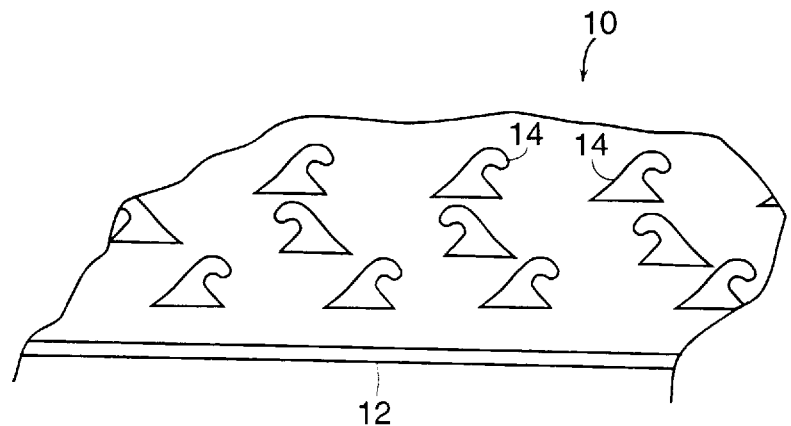
FIG. 1 is a perspective view of a portion of a hook fastener strip for engaging a loop product.
Figure 2:
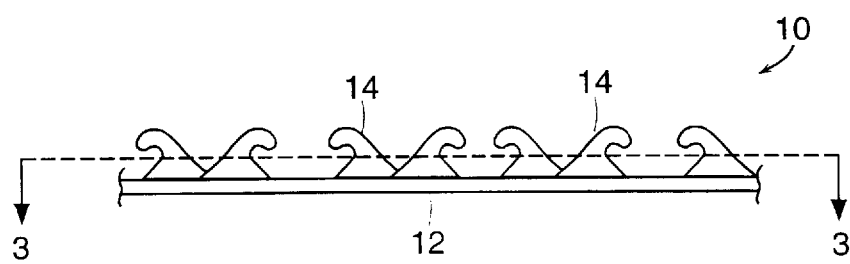
FIG. 2 is a side view of the strip of FIG. 1.
Figure 3:
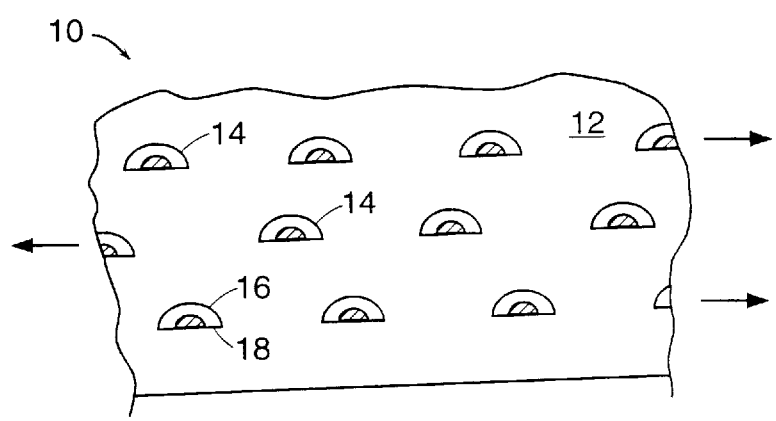
FIG. 3 is a cross-sectional view taken along line 3—3 in FIG. 2.

Referring to FIGS. 1–3, a hook component 10 of a touch fastener consists of a broad, sheet-form base 12 and multiple parallel rows of integrally molded hooks 14 extending from the base. Each hook 14 has a curved side 16 and a flat side 18, as shown in FIG. 3. Although only three rows are shown for illustration, it is to be understood that component 10 may have any number of rows. As shown, the hook elements in adjacent rows face in opposite directions along the extent of their respective rows, with their curved sides 16 facing in generally the same sideways direction. In another embodiment (not shown), adjacent rows of hooks 14 face in the same direction.

Figure 4:
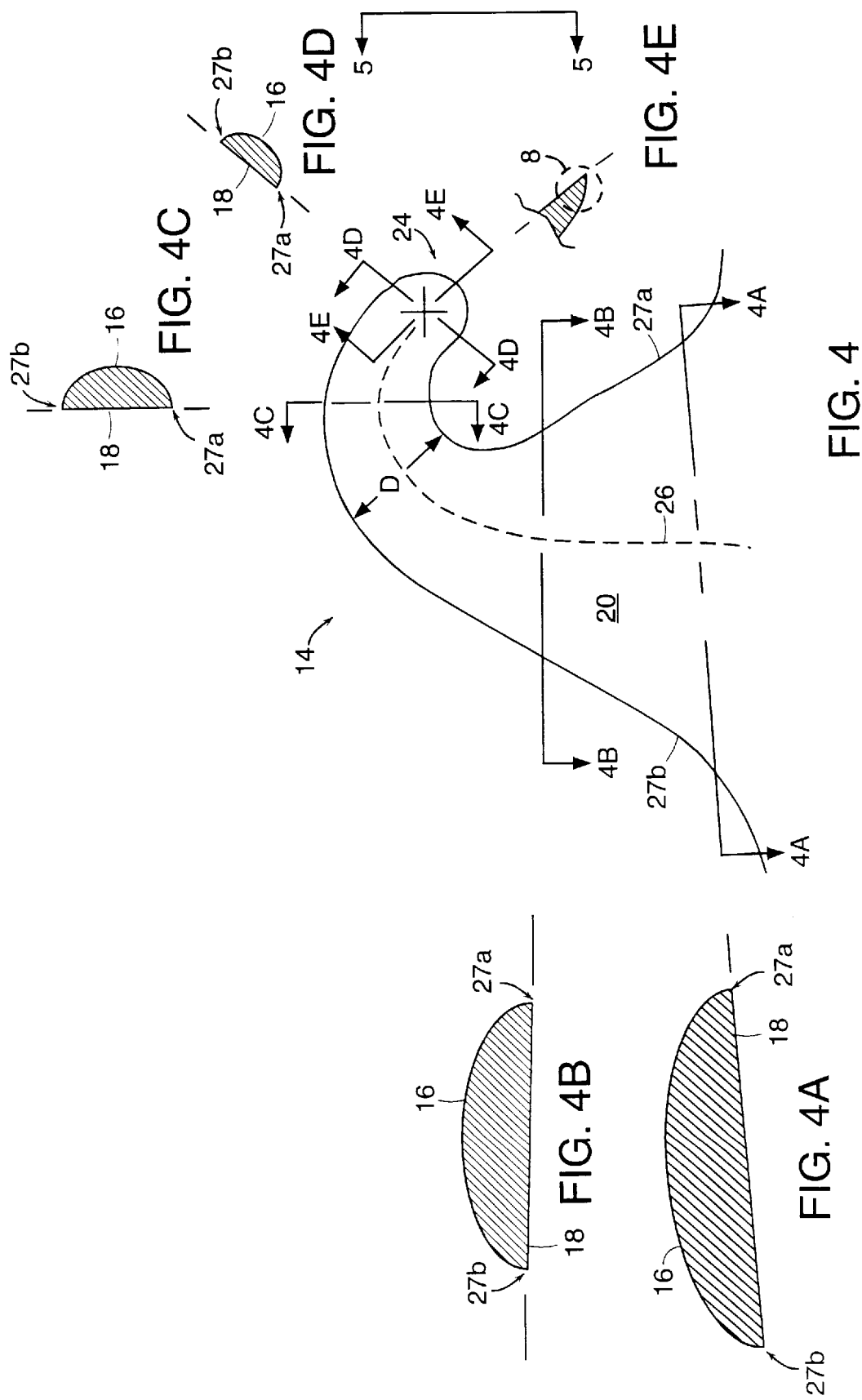
FIG. 4 is an enlarged side view of one of the hooks of FIG. 1.

An enlarged profile view of one of hooks 14 is shown in FIG. 4. The hook has a broad-based, tapered stem 20 which is integrally formed with and extends upwardly from the fastener base. In side profile, stem 20 has a generally straight sided, triangular shape that continuously tapers from the base. A tapered head 22 is integrally molded with the stem and overhangs one side of the stem to form a loopengaging crook. The hook profile centerline 26 extends generally vertically through stem 20 and then arches along a smooth curve to a distal tip 24. The head width, D, measured perpendicular to centerline 26, continuously decreases from the stem to the tip, though at a much lesser rate than the general taper of the width of the stem.

FIGS. 4A–4E, cross-sections of hook 14 in FIG. 4, illustrate the cross-sectional shape of the hook at several elevations. As indicated by these cross-sections, the thickness of the hook (i.e., the dimension of the hook perpendicular to the plane of the side profile of FIG. 4) is greatest near the centerline of the hook and decreases to a front edge 27a and a rear edge 27b between the flat and curved sides of the hook.

Figure 5:
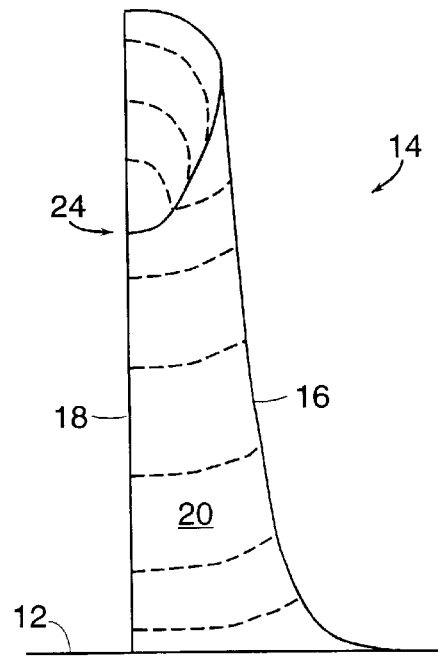
FIG. 5 is an end view of the hook of FIG. 4, taken from direction 5.

As shown in the front view of FIG. 5, the thickness of hook 14 also gradually decreases along the hook from base 12 to tip 24. The dashed lines indicate the curvature of the hook surfaces. Near tip 24, the taper rate of the thickness of the hook increases rapidly to provide a steep surface on the curved side of the hook in the vicinity of the tip. The construction of this surface affects the retention of an engaged loop, as will be explained more fully below.

Figure 6:
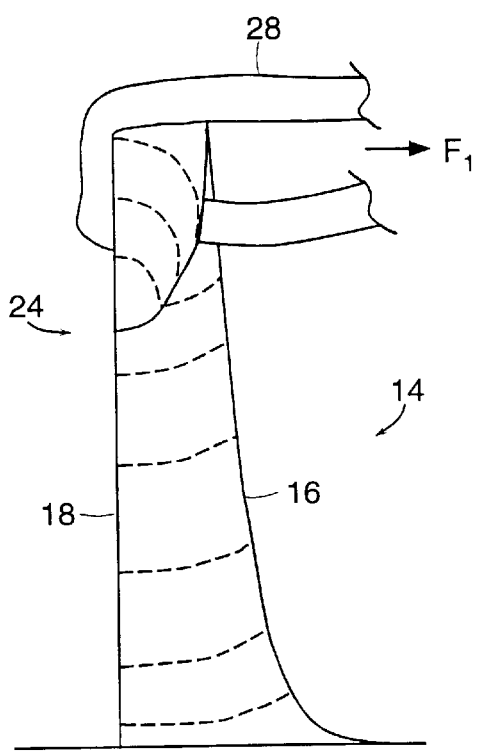
FIG. 6 shows a loop pulling against one side of the hook of FIG. 5, as in a fastener under shear load.

Referring to FIG. 6, an engaged loop 28 loaded in shear against the flat side 18 of hook 14 will be bent sharply about edges 27a and 27b of the hook. The load applied to the hook by the loop is concentrated at these edges as the hook begins to be bent about its base in the direction of the applied shear load $F_1$. Hook 14 tends to both bend and twist about its base under this load. As the stem bends, the curved side of the stem is generally compressed and the flat side of the hook is generally extended. As the stem twists, tip 24 is deflected toward the load (i.e., in the direction of load $F_1$). Eventually, under ever-increasing shear load, the loop will slide off of the head of the hook over tip 24.

Figure 7:
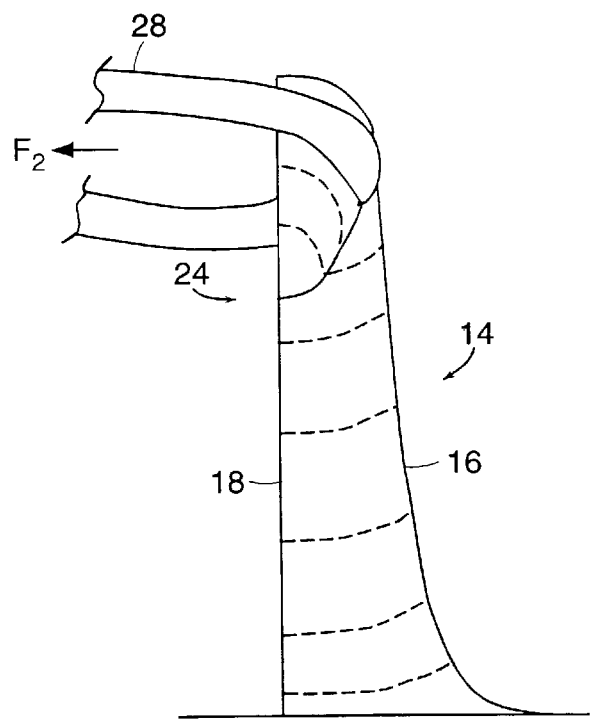
FIG. 7 shows a loop pulling against the other side of the hook of FIG. 5, as in a fastener under shear load.

Referring to FIG. 7, a loop 28 loaded in shear against the curved side 16 of hook 14 will not be as sharply bent about edges 27a and 27b as the loop shown in FIG. 6. Loaded against the curved side of the hook, the loop will tend to apply load $F_2$ to the hook more evenly along its length of contact with the hook head. As load $F_2$ increases, the hook will twist to deflect tip 24 toward the source of the load until loop 28 slides off of the hook head over the tip. For a similar amount of load $F_1$ and $F_2$, the localized contact load between loop 28 and hook 14 should be greater in the case of FIG. 6 (with the load concentrated near the edges of the hook) than in FIG. 7.

Referring back to FIGS. 1–3, the hooks 14 of hook component 10 are arranged in rows, with similarly constructed hook sides aligned in the same sideways directions, such that the hook component, when loaded by an engaged loop component in shear in one cross-machine direction, will have hooks loaded as shown in FIG. 6, and, when loaded by an engaged loop component in shear in the opposite cross-machine direction, will have hooks loaded as shown in FIG. 7. Such hook components have been tested in shear, and have demonstrated different shear properties in each of the cross-machine directions. As a non-limiting example of the effect achievable by this arrangement, arrays of hooks constructed with the shape shown in FIGS. 4–5 have demonstrated shear resistances, when loaded against the flat sides of the hooks as shown in FIG. 6, of up to three to five times their shear resistance when loaded against the curved sides of the hooks as shown in FIG. 7.

It is believed that the differences in construction of the surfaces of the two sides of the loop-engaging region of the hook provides this directional difference in shear properties. Prototype hooks constructed with the general shape as shown in FIGS. 4 and 5 have been observed to deflect as described above when loaded in cross-machine shear. These hooks provided a higher resistance to loop disengagement when loaded as shown in FIG. 6 than when loaded as shown in FIG. 7.

The following effects were observed in prototype hook tests. As the stem of the hook begins to twist about its base due to the applied load, the loop more readily slides off of the deflected head of the hook when loaded against the curved side than when loaded against the flat side, releasing the loop at lower loads and correspondingly lower hook deflections. This tendency is especially visible with the loop engaged by the hook near tip 24, where the curved side of the hook presents a steeply tapered surface to the loop. This tendency may be enhanced by minuscule imperfections along the edges 27a and 27b of the hook that snag loops loaded against the flat side of the hook, resisting the sliding of the loops along the edges of the hook toward the tip.

Figure 8:
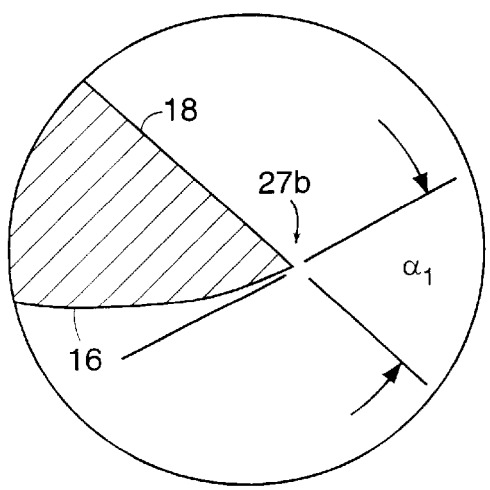
FIG. 8 is an enlarged view of area 8 in FIG. 4E.
Figure 8A:
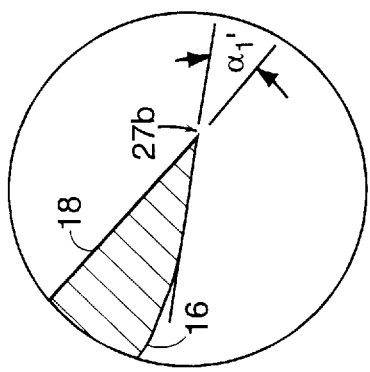
FIGS. 8A–8E illustrate alternate constructions of the hook head cross-section of FIG. 8.
Figure 8B:
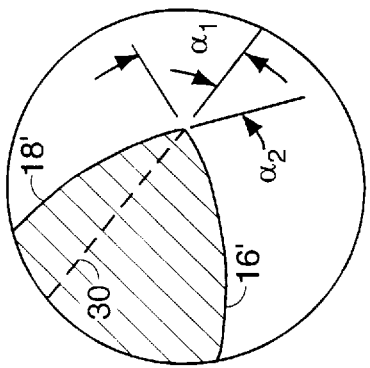

The difference in steepness of the two sides of hook 14 in the vicinity of tip 24 is illustrated in FIG. 8. The curved side 16 of the hook defines a slide-off angle $\alpha_1$ of about 70 degrees with the plane of the row of the hook in a cross-section extending in the direction of the hook centerline 26 (see FIGS. 4 and 4E), whereas flat side 18 of the hook, which is parallel to the hook row, has an effective slide-off angle of zero degrees.

Other hook shapes and constructions also provide this desired directional difference in cross-machine shear properties. Examples of some of these other constructions are illustrated in FIGS. 8A–8E. For instance, the hook of FIG. 8A has a curved side 16 and a flat side 18 like the hook of FIG. 8, but the curved side defines a slide-off angle $\alpha_1'$ of only about 30 degrees. The hook of FIG. 8B has two differently curved sides 16' and 18' which define slide-off angles $\alpha_1'$ (of about 70 degrees) and $\alpha_2$ (of about 35 degrees) respectively. In this instance, the edge of the hook is shown by dashed line 30 extending in the direction of the row of the hook.

Figure 8C:
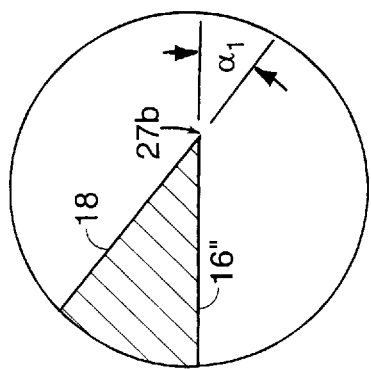
Figure 8D:
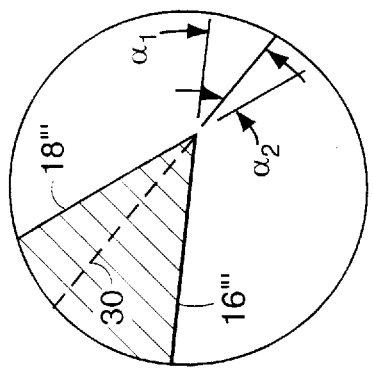
Figure 8E:
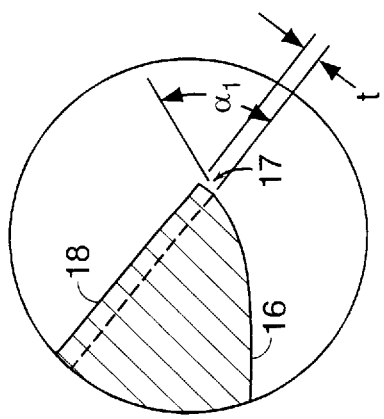

The invention is not intended to be limited to hooks with curved sides, as illustrated in the embodiments of FIGS. 8C and 8D. The hook of FIG. 8C, for example, has two regionally flat sides 18 and 16", with side 18 lying in the plane of the row of the hook. Side 16" defines a slide-off angle $\alpha_1$ of about 35 degrees with the direction of the row, and therefore presents a steeper surface for the loop to more readily slide against during release. The hook of FIG. 8D has two regionally flat sides 16''' and 18''' that define slide-off angles $\alpha_1$ (of about 70 degrees) and $\alpha_2$ (of about 35 degrees), respectively, with edge 30.

The two side surfaces of the hook do not necessarily have to meet at a sharp edge as is shown in FIGS. 8–8D. For instance, the side surfaces 16 and 18 of the hook of FIG. 8E meet at an edge 17 having a thickness, t, of about 0.001 inch. Curved side 16 defines a slide-off angle $\alpha_1$ of about 70 degrees where it meets edge 17, and flat side 18, which is parallel to the plane of edge 17, defines a zero slide-off angle.

In all of the above examples, the slide-off angles are shown as being measured in cross-sections taken in planes along the side profile centerline 26 of the hook at the hook tip 24 (e.g., section 4E—4E in FIG. 4). In addition to the vicinity of the tip, the construction of the side surfaces in other regions of the head of the hook also affects the hook's resistance to loop disengagement in shear. For instance, a loaded loop may initially pull against the hook at a section nearer to section 4C—4C in FIG. 4, as shown in FIGS. 6 and 7. Such a loaded loop, once sliding along the hook head toward the tip, is apt to keep sliding along the deflected head until it is completely disengaged. The ability of a hook head to resist loop sliding is related to, among other things, the side taper angle of the side of the hook at the point at which the loop is engaged.

Figure 9:
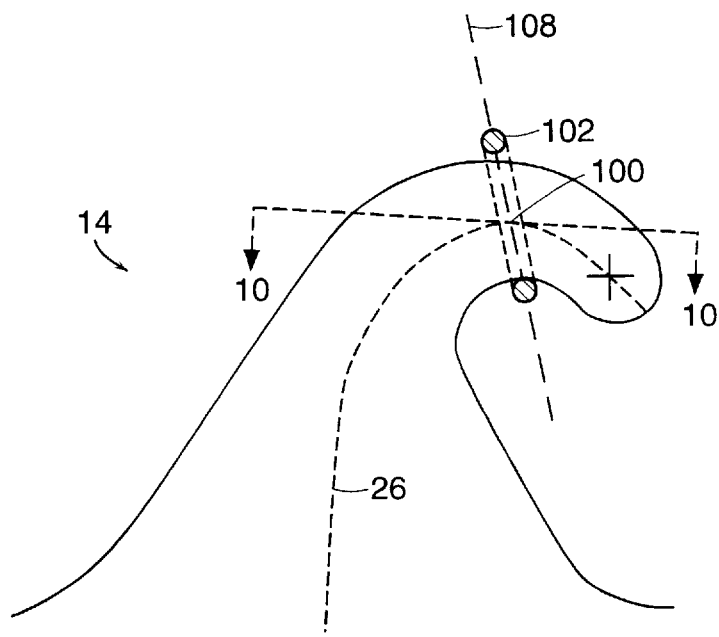
FIG. 9 is an enlarged side view of one of the hooks of FIG. 1, similar to FIG. 4.
Figure 10:
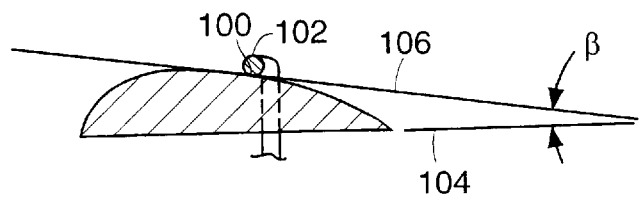
FIG. 10 is a cross-sectional view taken along line 10—10 in FIG. 9.

Referring to FIGS. 9 and 10, the "side taper angle" $\beta$ of a hook surface at a point 100 of contact with a loop 102 lightly pulling (i.e., such that the loop is taught but there is no hook deflection) in a cross-machine direction is defined as the angle between a line 104 extending along the direction in which the tip (e.g., tip 24) extends and a line 106 tangent to the hook surface at the point 100 of contact with loop 102 in a cross-section (e.g., 10—10) taken in a plane tangent to the hook side profile centerline 26 at the plane 108 formed by the loop. This side taper angle should be larger, in a given cross-section through the head of the hook, for one side of the hook than the other side of the hook in order to differentiate the loop-retaining properties of the two opposite sides of the hook. In general for hook heads with continuously tapering thicknesses, the steeper the thickness taper the greater the sum of the side taper angles on opposite sides in a given cross-section for a loop loaded in opposite directions. For the hook shown in FIG. 4, with one flat side parallel to the direction of extensity of the tip, the side taper angles at all points along the flat side of the hook head will be zero.

Referring to FIG. 11, a molded hook product 70 has two hook arrays 72 and 74 extending from a single base, one occupying one half of the product and the other occupying the other half. The hooks of array 72 have their flat sides all facing in one direction, and the hooks of array 74 have their flat sides all facing in the other direction, as indicated by arrows. Although in the illustrated embodiment each of the hooks of the two arrays have a flat side and a curved side (such as the hook of FIGS. 4 and 5), it should be understood that hooks according to any of FIGS. 8A–8E, or any other hook construction following the principles outlined herein, or any combination thereof, may be all aligned within each array to provide a preferred cross-machine orientation for loop retention. Between arrays 72 and 74 is a zone 76 without hooks, for slitting the product between the two hook arrays to produce two product strips, each having hooks aligned to face in only one direction. When molding such hook products in a continuous process on a rotating mold roll, for instance, the configuration illustrated in FIG. 11 can help to balance the cross-machine loads applied to the solidifying product in the demolding process. Product 70 may be slit by a stationary blade and rolled in a continuous process as it leaves the molding line, or manually in a secondary operation. To ease slitting or tearing, zone 76 should include a molded rip channel.

FIGS. 12 and 12A further illustrate various hooks with differently constructed opposite side surfaces. The hook 40 in FIG. 12 corresponds with FIG. 8B, having two curved surfaces 16' and 18' with different curvatures. The stem of hook 40 is correspondingly thicker than that of hook 14 of FIG. 5, and may provide increased stiffness where needed. FIG. 12A shows a hook with a flat surface 18 from which a molded support rib 15 extends, also providing a measure of additional bending stiffness to the stem of the hook without increasing the stiffness of the head, and leaving flat surface 18 exposed at the head for engaging loops.

Figures 13, 14:
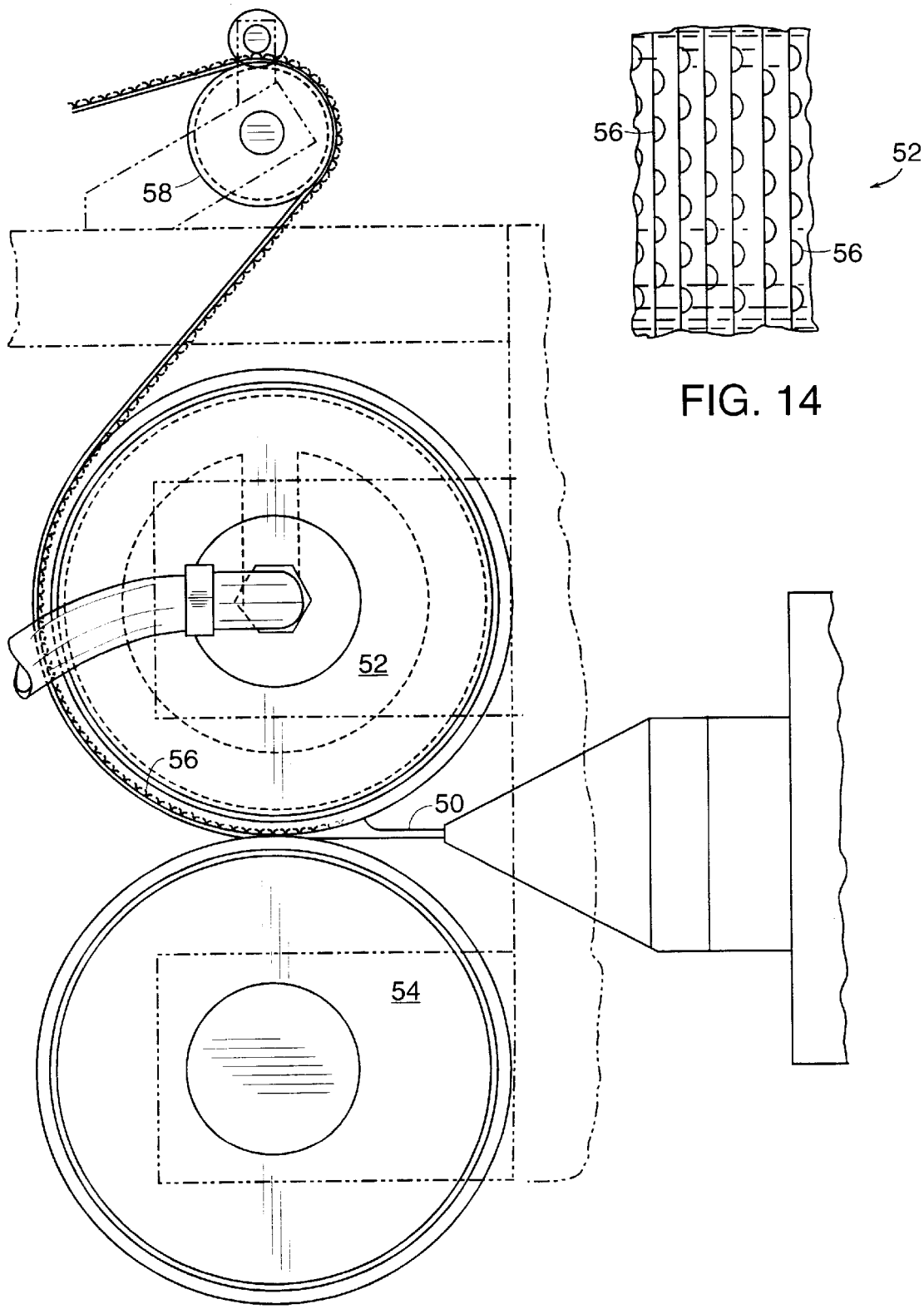
FIG. 13 shows an apparatus for continuous molding of hook fastener strip products.
FIG. 14 is a side view of a portion of the mold roll of FIG. 13, taken from direction 14—14.

The fastener elements described herein can be produced with modified versions of the equipment and methods disclosed by Fischer in U.S. Pat. No. 4,794,028, which is incorporated herein by reference. FIG. 13 shows a portion of a Fischer-type molding apparatus, in which a heat softened synthetic resin 50 is forced into a nip between a rotating mold roll 52 and a pressure-applying roll 54. Mold roll 52 has mold cavities 56 about its periphery that are configured to produce hooks. In operation, the hooks at least partially solidify and cool in the mold cavities to be able to be pulled intact out of the cavities, remaining integral with the base sheet of the product. In the embodiment shown, the hooks are pulled out of mold roll 52 by passing the product about an idler roll 58. As an alternative to using a rotating roll 54 to apply molding pressure, the injection head supplying the molten resin can be shaped to conform to the surface of the mold roll and apply resin at pressure to fill the mold cavities.

Referring to FIG. 14, mold roll 52 includes many annular, thin mold plates 60 held together as a stack to form a cylindrical surface. For molding hooks with one flat surface and one curved surface (e.g., hook 14 of FIGS. 4 and 5), mold cavities 56 are formed between curved mold surfaces in each mold plate and flat side surfaces of adjacent mold plates. The mold plates are stacked such that their curved mold surfaces all face in the same axial direction to produce an array of hooks as shown in FIGS. 1–3.

Figure 15:
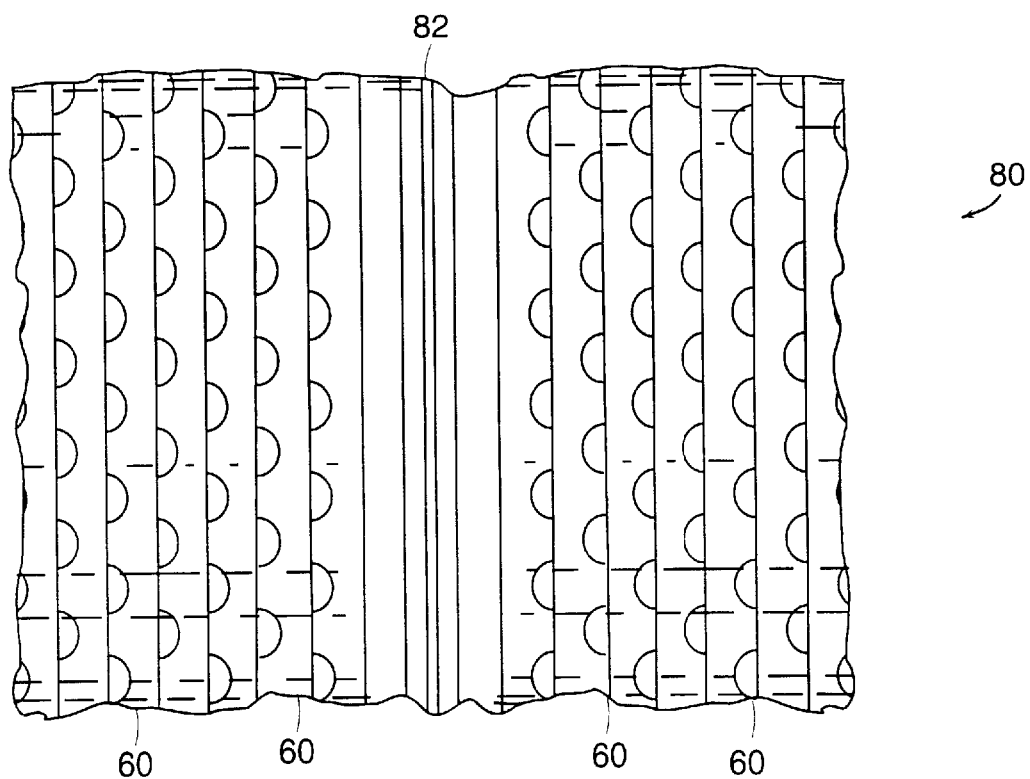
FIG. 15 shows an alternate construction of the mold roll of FIG. 14.

FIG. 15 illustrates the configuration of a mold roll 80 for molding the hook product 70 of FIG. 11. Mold roll 80 has two stacks of plates 60 separated by a channel-forming spacer 82. The plates of each stack are aligned to face in similar directions to mold the oppositely directed hook arrays of FIG. 11.

The above-described arrangements of male fastener elements is also useful in arrays of fastener elements formed by cyclic injection molding techniques.

For forming appropriately curved mold surfaces in mold plates and the like, photochemical etching techniques can be advantageously employed to produce very small and highly accurate mold surfaces. For a given plate, a piece of flat sheet stock is selected from which the mold cavity or cavity section is to be formed. In the case of a mold roll, the sheet stock is sized to form a component disk of the mold roll. The material may be 17-7 PH stainless steel or other suitable metal such as beryllium copper. A photosensitive media (e.g. a photoresist material) is applied over the plate and is exposed to a radiation (e.g., light) source through a compensating mask so that the photoresist will be removed where it is desired to remove metal to form the mold cavity. The mask blocks a predetermined portion of the light so that the photoresist material is exposed to a predetermined pattern of light. The mask is positioned between the light source and the photoresist material. In particular, the mask may be applied directly to the photoresist material.

When exposed to the light, a positive photoresist material cures onto the plate. The remaining portion of the photoresist material which was not exposed to the light is then removed. Alternatively, a negative photoresist material may be employed. When exposed to the light, the negative photoresist material is the portion that is removed. The remaining portion of the photoresist material which was not exposed to the light remains on the plate.

In FIG. 16, the mask is shown in dashed lines, superposed over the profile of the desired hook shaped cavity, shown in solid lines. The portion of the photoresist that is to be removed is within the dashed lines. After the photoresist is exposed to the light, the photoresist is washed away to expose the pattern of the art work. Then the metal sheet is placed in a machine, and the metal not covered by the photoresist material is removed by action of etchant. A spray of etchant (e.g., acid) is employed, as is conventional in photochemical milling. After milling, the portion of the metal plate covered by the photoresist layer remains.

With respect to FIG. 16, regions A–G designate different portions of the shape of the cavity and, diagrammatically, of the compensating mask. In some regions, the dashed line of the compensating mask and the edge of the desired cavity generally correspond, while in other regions they do not.

For straight line regions (e.g., region B in FIG. 16), the edge of the compensating mask generally corresponds to the desired straight line of the cavity profile (the shallower the mill depth, the closer the correspondence). However, in curved regions the lines of the mask diverge more substantially from the desired profile. The more radical the curvature, the greater is the difference between the mask and the desired profile. In areas where the curve of the desired cavity edge is convex, the compensation is to opposite effect to the compensation where the curvature is concave. In general, for etching convex edges, such as at A, the mask is compensated to be undersized with respect to the cavity because the action of the etchant will be relatively concentrated for a given length of cavity perimeter, relative to a straight edge. For concave edges, such as at C, the art work of the mask is enlarged to compensate in the opposite way. At region E in FIG. 15 the surface is even more convex than in region A (i.e., it has a smaller radius), and therefore the compensation is greater, providing more undersizing of the cavity defined by the mask.

The art work of the compensating mask defines points in the regions D and E. The tendency in photochemical milling is for sharp corners to be rounded. In this case, since a small rounded tip shape is desired, the compensated art work comes to a sharp point. Region F is a straight line, similar to region B, and region G corresponds to region A. Thus the art work profile for all regions of curvature of the hook is, in this example, different from the profile of the final hook cavity.

FIG. 16A shows a cross section of the metal after action of the etchant in which advantage is taken of the tendency in the photomilling process to produce a curved rather than a straight surface. This is found to generate a desirable rounded shape, particularly at the edge of the top of the hook. The rounded shape provides a surface that can more readily penetrate the surface of a mating loop fabric than a flat surface. Further, in important instances, the naturally rounded shape of the surface of the milled plate is exploited to create a smooth curve extending across several adjacent plates.

Selection of the particular compensating techniques for the art work, the photoresist materials, and the etchant depends upon the particular metal being exposed, the depth of metal removal and other conditions, as is well known in the art of photochemical machining. For specific process details, see the technical paper published in 1976 by the Society of Manufacturing Engineers, entitled "Photo-Chemical Machining Fundamentals With Three Unique Applications" by Dr. R. J. Bennett; Photo Chemical Machine Institute publication no. PCMI1000, entitled "What is Photo Chemical Machining Process and What Can It Do For You?"; conference proceedings of The Society of Carbide and Tool Engineers cosponsored by Medicut Research Associates, Inc. and the Abrasive Engineering Society, entitled "Nontraditional Machining Conference Proceedings of the Conference Held Dec. 2 and 3, 1985"; and to the references cited in those papers. The specifically cited papers are hereby incorporated by reference.

FIG. 17 illustrates an alternative compensating mask in which the straight lines and sharp corners are used to provide smooth, small radius surfaces in the produced part. The art work is shaped as small squares near the tip of the hook where a smooth radius of one curvature transitions into a smooth radius of the opposite curvature.

Various techniques are employed to obtain different desired profiles on the plates. For example, in producing cavities or cavity sections that extend through the plates, the plates can be photochemically milled from both sides, thereby reducing the total concavity of the milled surface, and, where desired, providing an overall convex surface. The sides of the plate can be exposed to the etchant for different amounts of time, creating different shapes at opposite sides of the plate. The etchant liquid is either sprayed at the surfaces to be etched, or directed in a stream to increase its local effectiveness.

Alternatively, laser cutting, electro-discharge machining or plating methods may also be used.

Other embodiments are also within the scope of the following claims, and other advantages will also be realized by those skilled in the art.

What is claimed is:

1. A hook-type fastener product for engaging loop elements to form a fastening, comprising a base;

an array of parallel rows of hooks extending from the base, the hooks extending generally along the direction of their respective rows, each hook having first and second oppositely-directed sides directed sideways relative to its row, each hook comprising a stem extending from the base to a distal end, and a head extending from the distal end of the stem to at least one tip, the head having first and second sides corresponding to the first and second sides of the hook, the sides of the hook head being differently constructed to cause a loop engaged to pull sideways against the first side of the hook head to be more firmly retained on the hook than a loop engaged to pull sideways against the second side of the hook head, a sufficient number of the hooks of the array having the first sides of their heads directed in the same sideways direction that the array of hooks, when engaged with loops, resists disengagement from the loops more strongly when pulled in a first sideways direction than when pulled in a second sideways direction opposite the first sideways direction.

2. The fastener product of claim 1 wherein a majority of the hooks have the first sides of their heads directed in the same sideways direction.

3. The fastener product of claim 2 wherein at least 75% of the hooks have the first sides of their heads directed in the same sideways direction.

4. The fastener product of claim 3 wherein substantially all of the hooks have the first sides of their heads directed in the same sideways direction.

5. The fastener product of claim 1 wherein, for each of the hooks, the hook has first and second edges defined between the first and second sides of the hook, the hook further defining a side profile centerline equidistant from said first and second edges and extending from the base to the tip, and wherein the thickness of the hook tapers, in the region of the head, to said first and second edges.

6. The fastener product of claim 5 wherein, for each of the hooks, the first and second sides of the hook head define first and second slide-off angles, respectively, at said tip in a cross-section taken in a plane tangent to the side profile centerline of the hook at the hook tip, the slide-off angles being measured with respect to a plane perpendicular to the base and extending along the row of the hook through the tip, the first slide-off angle being less than the second slide-off angle.

7. The fastener product of claim 6 wherein the first side of each hook head is substantially flat and planar and parallel to the direction of the rows of hooks, such that the first slide-off angle of each hook is about zero.

8. The fastener product of claim 5 wherein, for each of the hooks, the first and second sides of the hook head define first and second side taper angles, respectively, in a plane parallel to the base and tangent to the side profile centerline of the hook, said side taper angles being measured between a plane perpendicular to the base and extending along the row of the hook and a line tangent to the respective side of the hook, the second side taper angle being larger than the first side taper angle.

9. The fastener product of claim 8 wherein the second side taper angle is at least 5 degrees larger than the first side taper angle.

10. The fastener product of claim 9 wherein the second side taper angle is at least 10 degrees larger than the first side taper angle.

11. The fastener product of claim 5 wherein, for each of the hooks, the first and second sides of the hook head define first and second side taper angles, respectively, in planes tangent to the side profile centerline of the hook, said side taper angles being measured between a plane perpendicular to the base and extending along the row of the hook and a line tangent to the respective side of the hook, the second side taper angle continuously decreasing from the stem to the tip of the hook.

12. The fastener product of claim 1 wherein, in a cross section of the head of each of the hooks, the second side of the hook head forms a substantially smooth curve.

13. The fastener product of claim 12 wherein, for each of the hooks, the second side of the hook head comprises a convex surface extending from an upper edge of the head to a lower edge of the head and from the tip to at least the portion of the head most distant from the base.

14. The fastener product of claim 12 wherein the first side of each hook head is substantially flat and planar.

15. The fastener product of claim 14 wherein the stem of each hook comprises a reinforcing portion extending laterally from the plane of the first side of the hook head to resist bending of the stem of the hook.

16. The fastener product of claim 12 wherein, in said cross section of the head of each of the hooks, the first side of the hook forms a substantially smooth curve having a larger overall radius of curvature than the smooth curve of the second side of the hook.

17. The fastener product of claim 16 wherein the first side of each hook comprises a convex surface extending from an uppermost edge of the head of the hook to a lowermost edge of the head of the hook.

18. The fastener product of claim 1 wherein the base is of strip form with first and second longitudinal edges, comprising first and second parallel arrays of hooks,
   a sufficient number of the hooks of the first array having their first sides directed toward the first edge of the base that the first array of hooks, when engaged with loops, resists disengagement from the loops more strongly when the hooks are pulled by the loops toward the second edge of the base than when pulled toward the first edge of the base, and
   a sufficient number of the hooks of the second array having their first sides directed toward a second edge of the base that the second array of hooks, when engaged with loops, resists disengagement from the loops more strongly when the hooks are pulled by the loops toward the first edge of the base than when pulled toward the second edge of the base.

19. The fastener product of claim 1 wherein the hooks are integrally molded with the base.

20. The fastener product of claim 19 wherein the hooks are formed by the process of
   filling hook-shaped cavities with molten polymer material;
   cooling the material in the hook-shaped cavities to form molded hooks; and
   stripping the molded hooks from their cavities.

\* \* \* \* \*